July 3, 1934.  A. T. HARRIS  1,964,730
POWER TRANSMISSION DEVICE
Filed June 15, 1933   3 Sheets-Sheet 2
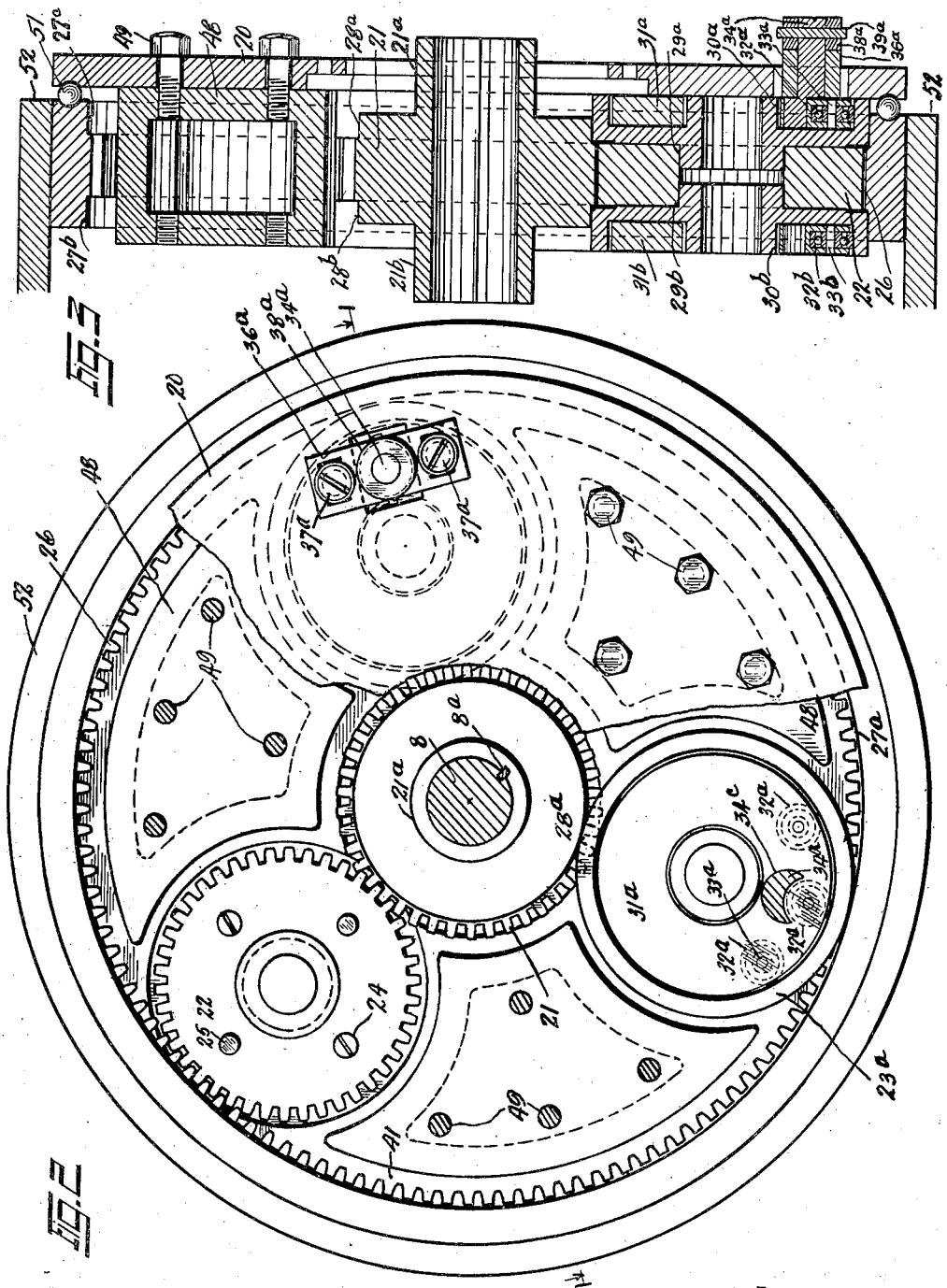
INVENTOR.
Albert T. Harris
By Maurice Bloch
ATTORNEY July 3, 1934.  A. T. HARRIS  1,964,730
POWER TRANSMISSION DEVICE
Filed June 15, 1933  3 Sheets-Sheet 3
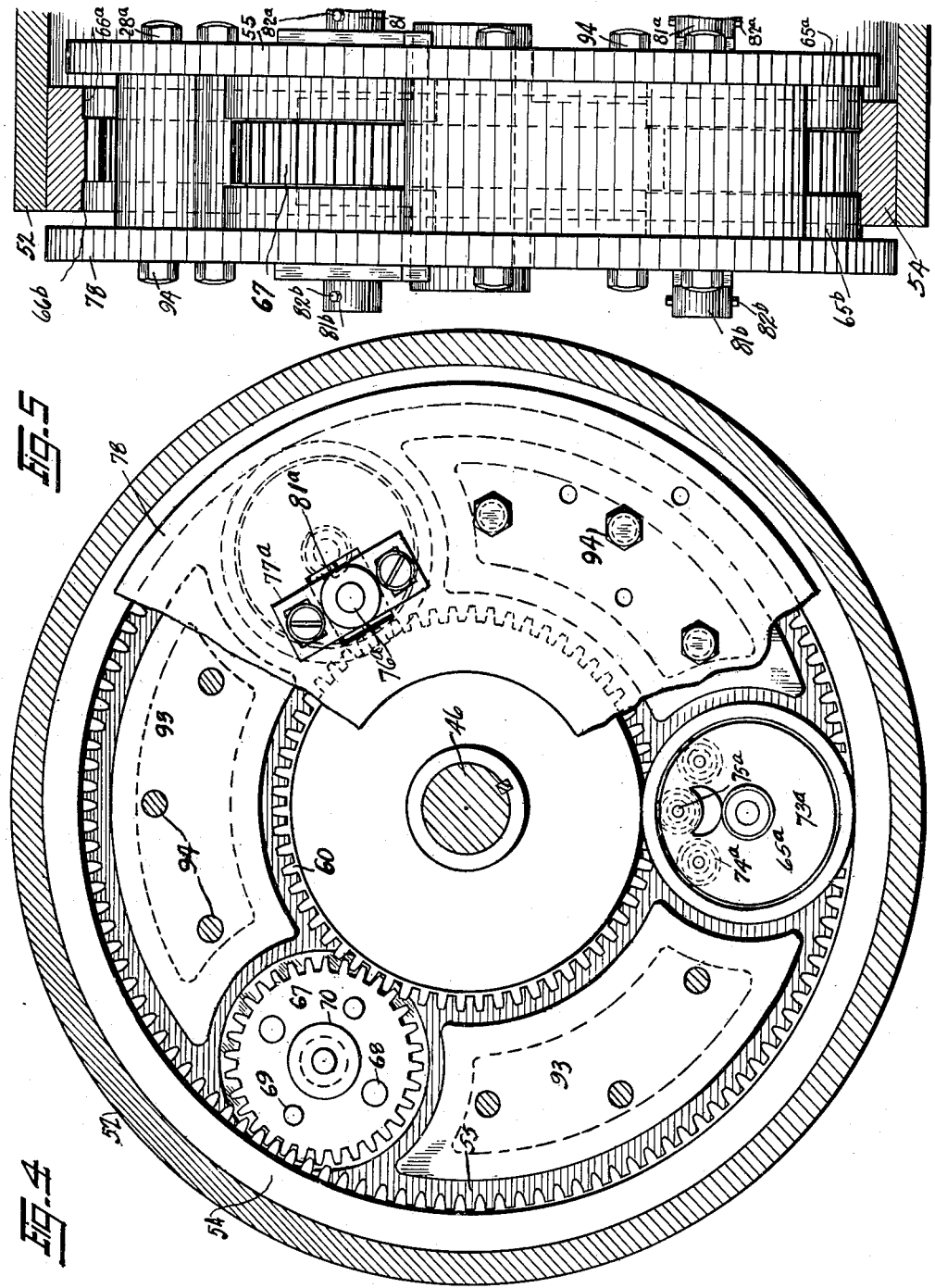
INVENTOR
Albert T. Harris
By
ATTORNEY Patented July 3, 1934

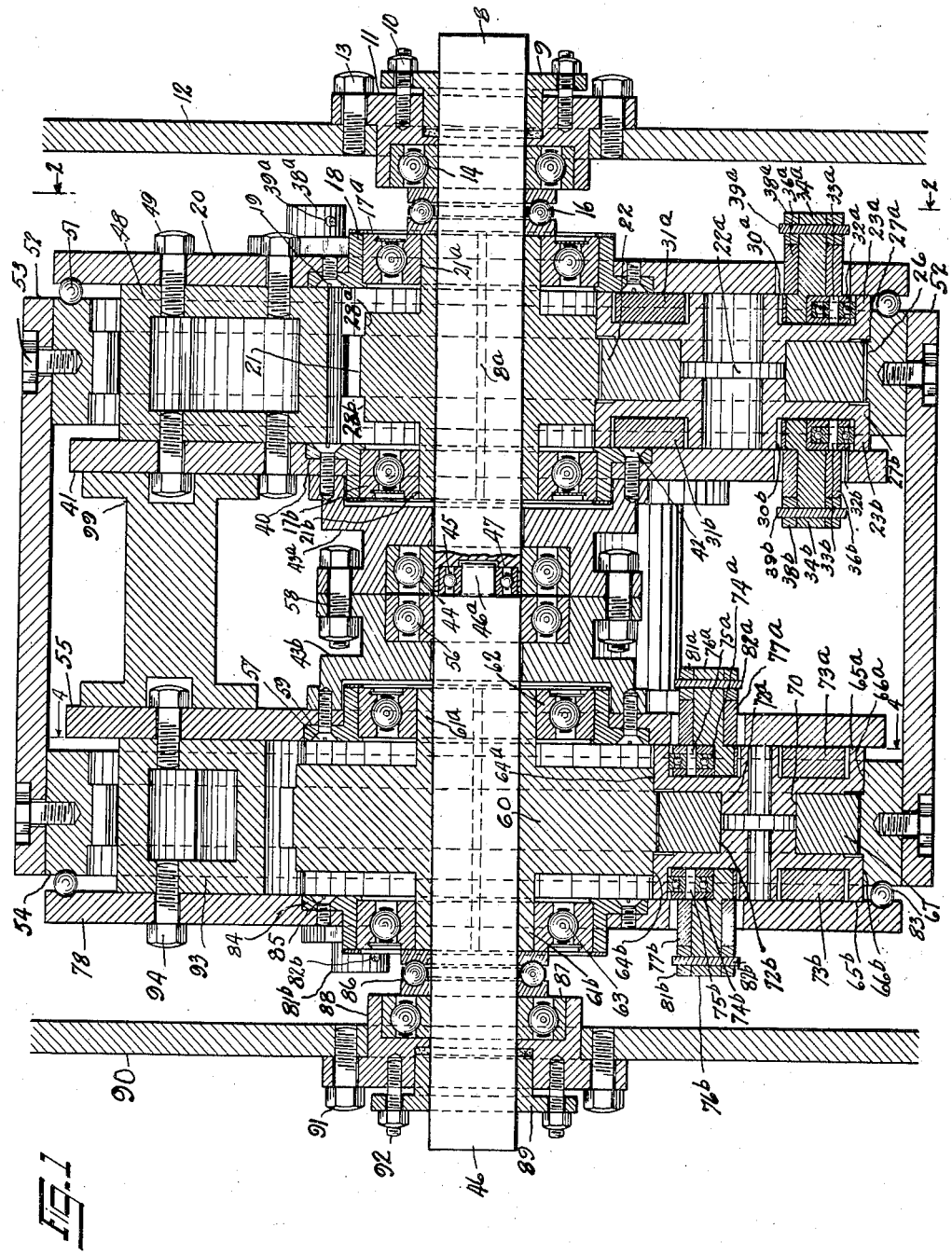

1,964,730

UNITED STATES PATENT OFFICE 1,964,730

POWER TRANSMISSION DEVICE

Albert T. Harris, New York, N. Y., assignor, by mesne assignments, to A. T. Harris Holding Corporation, a corporation of New York Application June 15, 1933, Serial No. 676,001

10 Claims. (Cl. 74—34)

This invention relates to power transmission devices adapted to be coupled to or secured to machines of various kinds, and has for one of its objects the provision of a device of this character which will deliver at its output end greater power than that delivered by ordinary transmission devices.

A further object of the invention is to produce a device of this nature comprising a pair of power transmission units in which the first unit increases the power applied thereto but causes a reduction in the speed, the second unit being so arranged as to further increase the power but to increase the speed as required.

Another object is to produce a device of the character described in which the maximum simplicity of construction and operation is secured.

Other objects and advantages will appear as the nature of the improvements is better understood, the invention consisting substantially in the novel arrangement and corelation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which—

Figure 1 is a sectional view of the device taken on line 1—1 Fig. 2.

Fig. 2 is an end view of the device looking along line 2—2 Fig. 1 with some of the parts broken away and other parts omitted therefrom.

Figure 3 is a sectional view of the first unit only with some of the parts omitted.

Figure 4 is a sectional view of the second unit taken on line 4—4 Fig. 1, and

Figure 5 is a side view partly in section of the second unit.

Referring now to the drawings in detail 8 is a shaft to which power may be applied by coupling same to an engine or motor and which rotates in a stuffing box 9 secured by bolts 10 passing through same and which are threaded into the stuffing box gland 11 secured to an outer casing head 12 by bolts 13.

Within the gland 11 there is suitably provided a ball bearing 14 on which the shaft 8 rotates. A thrust bearing 16 is placed between the ball bearing 14 and shoulder 21a of a main drive gear 21 keyed to the shaft 8 by means of a key 8a. A ball bearing 17a upon the shoulder 21a also bears against the face of the thrust bearing 16 and is housed in a housing 18 secured by screws 19 to the web plate 20. A ball bearing 17b is provided for the left hand shoulder 21b of the gear 21 and is contained in a casing 40 secured by screws 42 to a second web plate 41.

In mesh with the gear 21 are three gears 22 which are also in mesh with a ring or internal gear 26 upon which they roll. Secured to each of the gears 22 by means of screws 24 and dowels 25 are a pair of plates 23a and 23b one on each side and the said plates are respectively provided with circular grooves 30a and 30b in which there are located drift plates 31a and 31b. The plates 23a and 23b are in contact with and roll over shoulders 28a and 28b on the drive gear 21. (See Figs. 1 and 2) and on the interior surfaces 27a and 27b one on each side of the ring gear 26. The said plates 23a and 23b are each respectively further provided with hubs or shoulders 29a and 29b which project into a central hole 22a in the gears 22.

Secured to the drift plates 31a are three ball bearing rollers 32a by means of pins 33a. Similar rollers 32b are secured by means of pins 33b in the plates 31b. Two of these rollers are always in contact with the grooves, 30a and 30b. The said drift plates carrying the said rollers are brought into proper relation with respect to the grooves 30a and 30b by means of adjustment plates 36a and 36b carrying shouldered driving pins 34a and 34b which pass through the said adjustment plates and project into crescent shape openings 34c in the drift plates, the said adjustment plates being secured to the web plates 20 and 41 by means of screws 37a. The pins 34a and 34b are held in place by means of pins 39a and 39b respectively passing through respective washers 38a and 38b.

The plates 20 and 41 are separated by filler blocks 48 and are secured to the said plates by means of bolts 49. The ring gear 26 is secured to an outer drum or casing 52 by means of bolts 53 and is spaced from the web plate 20 by a roller bearing 51.

The mechanism just described comprises the first or power and speed reduction unit and is secured to the second or power and speed increasing unit by means of a pair of coupling casings 43a and 43b, the former being secured to the web plate 41 by means of the screws 42 and the latter by means of screws 57 passing through a web plate 55, and are secured to each other by means of bolts 58.

The said second unit comprises a shaft 46 having a reduced shoulder portion 46a which fits into a ball bearing 45 carried in a bore 47 in the shaft 8. The casing 43a has a ball bearing 44 for the shaft 8 and the casing 43b has a similar ball bearing 56 for the shaft 46. The screws 57 which secure the casing 43b also secures a casing 59 having a ball bearing 62 mounted therein and upon a shoulder 61a at the inner end of a gear 60 keyed to the shaft 46. The said gear is provided at its opposite end with a second shoulder 61b upon which is mounted a ball bearing 63 in a casing 84 secured by screws 85 to the left hand web plate 78.

The gear 60 is of larger diameter than the gear 21 and is in mesh with pinions 67 which coact with a ring gear 54 in the same manner as the gears 22 coact with the gear 26.

Each of the gears or pinions 67 is provided with plates 65a and 65b similar in all respects to the plates 23a and 23b which carry drift plates 73a and 73b carrying ball bearings 74a and 74b upon pins 75a and 75b respectively and shouldered drive pins 76a and 76b and maintained in place on adjusting plates 77a and 77b by pins 82a and 82b and collars 81a and 81b.

Like the plates 23a and 23b, the plates 65a and 65b coact with shoulders 64a and 64b on the gear 60 and with grooves 66a and 66b on the gear 54, the said plates being provided with shoulders 72a and 72b which fit into holes 70 in the gears 67. Like the gear 26 the gear 54 is secured to the outer casing 52 by bolts 53 and is separated from the outer web plate 78 by a ball bearing 83. The web plates 55 and 78 are separated by blocks 93, which are held in place by bolts 94. Blocks 99 brace the web plates 41 and 55.

At the extreme left of the device there is provided an outer casing head 90 to which there is secured by bolts 91 a casing 88 housing a ball bearing 87 at its inner end, and a stuffing box gland 89 secured by means of screws 92. A thrust bearing 86 is carried on the shaft 46 between the gear shoulder 61b and the ball bearing 87.

The operation of the device is as follows: Power is applied from a motor or engine to the shaft 8 which transmits same to the gear 21 which in turn transmits power and motion to the gears 22 whose teeth being in mesh with the teeth of the stationary gear 26 causes the said gears to travel in the direction of rotation of gear 21. The power applied to the said gears 22 is transferred to the drift plates 31a and 31b by their respective rollers, thence to the driving pins 34a and 34b carried by the said plates, the said pins in turn transferring the said power and motion to the web plates 20 and 41, through the adjustment blocks 36a and 36b to which they are secured.

Due to the positioning of the rollers 32a and 32b with respect to the pitch line of the gear 21 and the pitch line of the gear 26 with which the gears 22 are in mesh, the power transmitted to web plates is increased in proportion to the distances between the said rollers and the aforementioned pitch lines. In other words the further the rollers are placed from the center line of the shaft 8, the greater will be the increase in power. Due to the proportion of the gears 21, 22 and 26, the speed of travel of the web plates will be less than the shaft 8. In other words the speed transmitted to web plates 55 and 78 of the second unit will be less than the speed of shaft 8 but the power will be greater than that applied to the said shaft. I find, however, that the gain in power greatly exceeds the loss in speed.

In the second unit the power and rotation is transmitted from the web plates 55 and 78 to the pins 75a and 75b by the adjustment plates 77a and 77b, thence to the drift plates 73a and 73b, and rollers 74a and 74b to the plates 65a and 65b and gears 67, thence to the gear 60 and shaft 46.

It will be seen that the gear 60 is larger in diameter than the gear 21 and that the gears 67 are smaller in diameter than the gears 22, thus increasing the speed of the shaft 46 over that of the web plates. It will also be noted that the rollers 74a and 74b are considerably nearer to the pitch circle of the gear 60 and center of shaft 46, than the rollers 32a and 32b are to the pitch circle of the gear 21 and shaft 8, thus increasing the power applied to the delivery shaft 46. In this unit, the nearer the rollers are to the center line of the shaft 46, the greater will be the efficiency thereof.

From which it will be seen that I have provided a power transmitting device which is far more efficient than any power transmitting device now in use.

Having described my invention what I claim as new and desire to secure by Letters Patent is:

1. A power transmitting device comprising a power shaft, a gear secured thereto, a pair of web plates rotatable about the said gear, a stationary ring gear, a third gear in mesh with the said gears, a drift plate at each side of said third gear, a set of three rollers carried by each of the said drift plates in operative association with the said third gear, a pin extending from each of the said drift plates in operative engagement with the web plates, and an element driven by and in operative communication with the web plates.

2. A power transmitting device comprising a power shaft, a gear secured thereto, a pair of web plates rotatable about the said gear, a stationary ring gear, a third gear in mesh with the said gears, an annularly grooved casing secured to and at each side of the said third gear, a drift plate in each of the said casings, a set of three rollers carried by each of the said plates in operative association with the groove in the said casing, a pin extending from each of the drift plates through the web plates, means for securing the said pins to the web plates, and an element driven by and in operative communication with the web plates.

3. A power transmitting device comprising a power shaft, a gear secured thereto, a pair of web plates rotatable about the said gear, a stationary ring gear, a third gear in mesh with the said gears, an annularly grooved casing secured to and at each side of the said third gear, a drift plate in each of the said casings, a set of three rollers carried by each of the said plates in operative association with the groove in the said casing, the said rollers being nearer to the pitch line of the stationary gear than to the pitch line of the first mentioned gear, a pin extending from each of the drift plates through the web plates, means for securing the said pins to the web plates, and an element driven by and in operative communication with the web plates.

4. A power transmitting device comprising a power shaft, a gear secured thereto, a pair of web plates rotable about the said gear, a stationary ring gear, three gears equidistantly spaced apart and in mesh with the power and stationary gears, annularly grooved casings on the last mentioned gears, drift plates in the said grooves, a set of three rollers carried by the said drift plates in operative engagement with the casing grooves and closer to the pitch line of the stationary gear than to the pitch line of the power shaft gear, a pin extending from each of the drift plates through the web plates, an adjustment plate on each of the said pins removably secured to the web plates, and an element driven by and in operative communication with the web plates.

5. In a power transmission device, the combination of a power shaft, a gear thereon, a stationary ring gear, intermediate gears in mesh with both of the aforementioned gears, web plates rotatable about the power shaft gear, roller means in operative association with the intermediate gears, pins in operative association with the said rollers and web plates, and an element driven by and in operative communication with the web plates.

6. A power transmitting device comprising a power shaft, a gear secured thereto, a pair of web plates rotatable about the said gear, a stationary ring gear, a third gear in mesh with the said gears, an annularly grooved casing secured to and at each side of the said third gear, a drift plate in each of the said casings, a set of three rollers carried by each of the said plates in operative association with the groove in the said casing, a pin extending from each of the drift plates through the web plates, means for securing the said pins to the web plates, a flange on the last mentioned gears in engagement with the stationary and power gears, and an element driven by and in operative communication with the web plates.

7. A power transmission device comprising a power shaft, a delivery shaft, a power increasing and speed reducing unit on the power shaft the said unit including suitable gearing, and a web plate driven by the said gearing, and a power and speed increasing unit on the delivery shaft operatively coupled to the web plate.

8. A power transmission device comprising a power shaft, a power increasing and speed reducing unit on the power shaft, the said unit comprising a gear on the power shaft, a pair of web plates rotatable about the ends of the said gear, a stationary gear, intermediate gears in mesh with the power and stationary gears, rollers located nearer to the pitch circle of the stationary gear than to the pitch circle of the power gear and in operative engagement with the said intermediate gears, and pins in operative association with the said rollers and web plates for the purpose specified, a delivery shaft and a power and speed increasing unit on the said shaft coupled to the first mentioned unit comprising substantially the same elements as the said first mentioned unit with the exception that the rollers of the said second mentioned unit are placed in reverse relation with respect to the gears.

9. In a power transmission device, a power shaft, a gear secured thereto, a web plate rotatable about the said gear, a stationary ring gear, an intermediate gear in mesh with the aforementioned gears, an annularly grooved casing secured to the intermediate gear, a drift plate in the groove of the said casing, a plurality of rollers carried by the said drift plate suitably spaced from the power gear and stationary gear and in operative engagement with the casing groove, a pin extending from the drift plate and secured to the web plate, a delivery shaft and mechanism carried by the said delivery shaft operatively coupled to the web plate.

10. A power transmitting device comprising a power shaft, a gear secured thereto, a pair of web plates rotatable about the said gear, a stationary ring gear, a third gear in mesh with the said gears, a drift plate at each side of the said third gear, a set of three rollers carried by each of the said drift plates in operative association with the said third gear, means for transmitting power from the drift plate to the web plate, and an element driven by and in operative communication with the web plates.

ALBERT T. HARRIS.